United States Patent
Ranpise et al.

(10) Patent No.: US 11,743,229 B2
(45) Date of Patent: Aug. 29, 2023

(54) EFFICIENT ARP BINDINGS DISTRIBUTION IN VPN NETWORKS

(71) Applicant: Arista Networks, Inc., Santa Clara, CA (US)

(72) Inventors: Amit Dattatray Ranpise, San Jose, CA (US); Rajesh Kumar Semwal, Sunnyvale, CA (US); Alton Lo, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/726,055

(22) Filed: Apr. 21, 2022

(65) Prior Publication Data
US 2022/0247710 A1 Aug. 4, 2022

Related U.S. Application Data

(62) Division of application No. 16/746,564, filed on Jan. 17, 2020, now Pat. No. 11,323,409.

(51) Int. Cl.
*H04L 61/10* (2022.01)
*H04L 12/46* (2006.01)
*H04L 61/2592* (2022.01)

(52) U.S. Cl.
CPC .......... *H04L 61/10* (2013.01); *H04L 12/4641* (2013.01); *H04L 61/2592* (2013.01)

(58) Field of Classification Search
CPC . H04L 61/10; H04L 12/4641; H04L 61/2592; H04L 45/586; H04L 2101/622; H04L 12/4633; H04L 45/04; H04L 45/64; H04L 61/103; H04L 12/46
See application file for complete search history.

(56) References Cited

U.S. PATENT DOCUMENTS

| | | | |
|---|---|---|---|
| 7,570,625 B1 * | 8/2009 | Ocepek | H04W 12/122 370/328 |
| 10,250,552 B1 | 4/2019 | Sajassi | |
| 10,432,503 B1 * | 10/2019 | Rzehak | H04L 69/04 |
| 10,802,775 B2 | 10/2020 | Mosko | |

(Continued)

FOREIGN PATENT DOCUMENTS

| | | |
|---|---|---|
| EP | 3275132 A1 | 1/2018 |
| WO | 2015003029 A1 | 8/2015 |

OTHER PUBLICATIONS

Mahalingam, et al., "RFC 7348—Virtual eXtensible Local Area Network (VXLAN): A Framework for Overlaying Virtualized Layer 2 Networks over Layer 3 Networks", Aug. 2014, https://tools.ietf.org/html/rfc7348, 23 pages.

(Continued)

*Primary Examiner* — El Hadji M Sall
(74) *Attorney, Agent, or Firm* — Fountainhead Law Group P.C.

(57) ABSTRACT

In response to receiving an ASR message, a VTEP generates a specially modified control plane message advertising the IP-to-MAC binding of the ASR message. The control plane message may be modified to indicate that it is not to be used for MAC learning. The control plane message is advertised over the network. When an intended recipient receives the message, it uses that message just for the IP-to-MAC binding. When an unintended recipient receives the message, it may drop it as invalid.

16 Claims, 8 Drawing Sheets

(56) References Cited

U.S. PATENT DOCUMENTS

| | | |
|---|---|---|
| 11,012,405 B2 | 5/2021 | Mandal et al. |
| 2002/0024964 A1* | 2/2002 | Baum .................. H04L 12/4641 |
| | | 370/463 |
| 2007/0147283 A1* | 6/2007 | Laroia ..................... H04L 45/02 |
| | | 370/328 |
| 2007/0147377 A1* | 6/2007 | Laroia .................. H04W 48/10 |
| | | 370/395.3 |
| 2021/0226910 A1 | 7/2021 | Ranpise et al. |

OTHER PUBLICATIONS

Sajassi, "RFC 8365—A Network Virtualization Overlay Solution Using Ethernet VPN (EVPN)", Internet Engineering Task Force (IETF), Mar. 2018, https://tools.ietf.org/html/rfc8365, 34 pages.

"VXLAN and EVPN for data center network transformation", 2017 8th International Conference on Computing, Communication and Networking Technologies (ICCCNT), IEEE, Jul. 3, 2017, pp. 1-6.

International Search Report and Written Opinion dated May 3, 2021, PCT Application No. PCT/US2021/013229, filed Jan. 13, 2021.

\* cited by examiner

EFFICIENT ARP BINDINGS DISTRIBUTION IN VPN NETWORKS

CROSS-REFERENCE

This application is a divisional application and, pursuant to 35 U.S.C. § 120, is entitled to and claims the benefit of earlier filed application U.S. application Ser. No. 16/746,564 filed Jan. 17, 2020, the content of which is incorporated herein by reference in its entirety for all purposes.

BACKGROUND

The present disclosure relates to synchronization of Address Resolution Protocol (ARP) bindings using a control plane of Ethernet Virtual Private Networks (EVPNs).

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
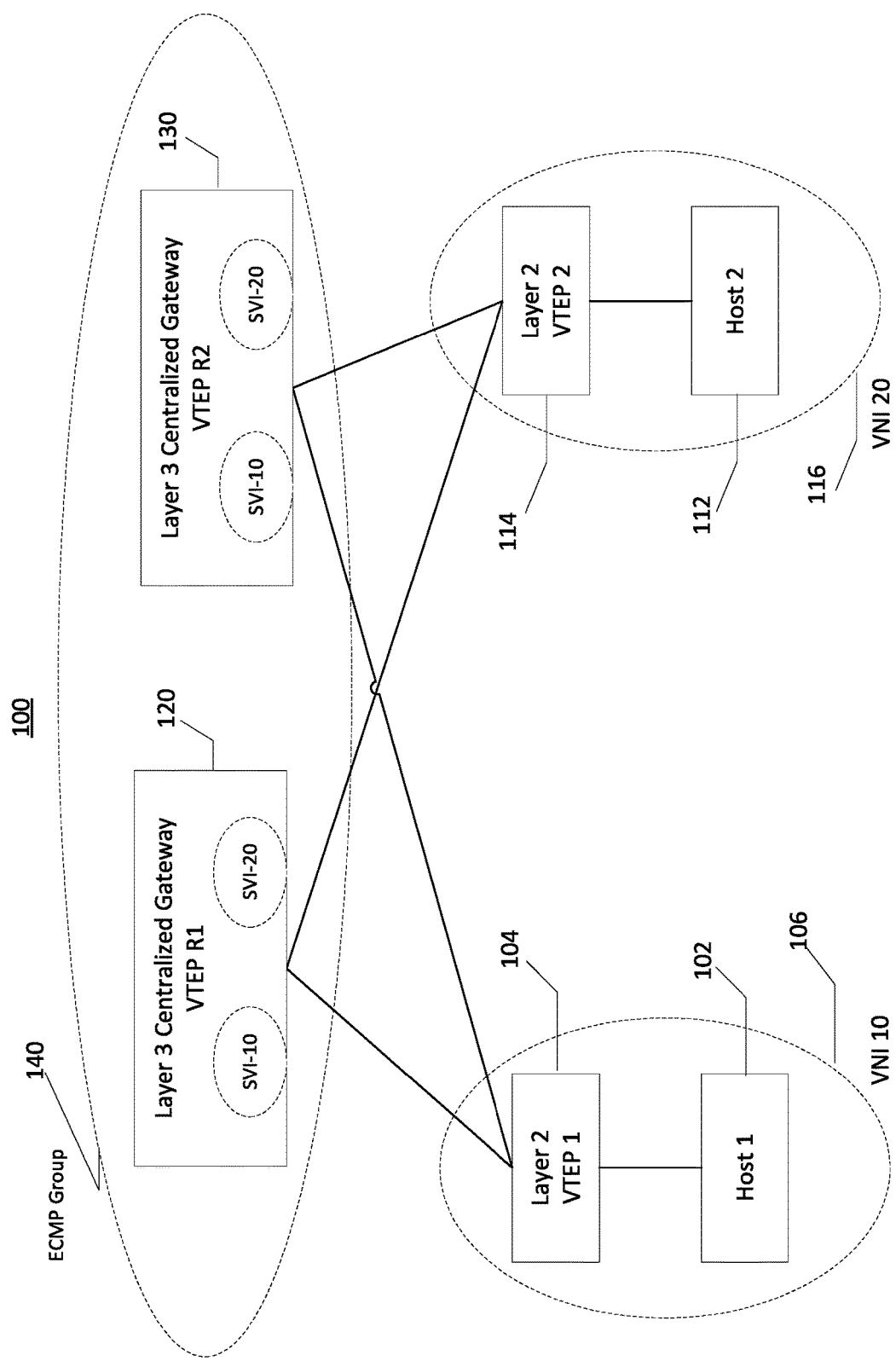
FIG. 1 shows an illustrative network topology of a system for synchronization of ARP binding for EVPNs, in accordance with some embodiments of the disclosure.

In some computer network architectures configured according to a centralized routing model, routers or switches configured as layer 2 (L2) virtual extensible local area network (VxLAN) tunnel endpoints (VTEPs) are connected to two or more redundant layer 3 (L3) VTEPs that are set up in a distributed router configuration. The L3 VTEPs will often perform L3 routing operations for the hosts connected to the L2 VTEPs and the L2 VTEPs provide L2 bridging functionality. In this scenario, the L3 VTEPs are configured with a shared virtual internet protocol (VIP) address and a shared virtual media access control (MAC) address. The L3 VTEPs are further configured with virtual network interfaces dedicated to (and operating as gateways for) each subnet served by the L3 VTEPs. The virtual network interfaces dedicated to each respective subnet share common VIP addresses and virtual MAC addresses. For example, each L3 VTEP has a separate virtual network interface dedicated to each respective subnet for which the L3 VTEP performs L3 routing, and the virtual network interfaces that are dedicated to the same subnet share the same VIP addresses and virtual MAC addresses. In some configurations, a single virtual MAC address is shared among all the virtual network interfaces even if they are dedicated to different subnets. In yet other configurations, a single virtual MAC address is used for the L3 VTEPs themselves and all of the virtual network interfaces.

Hosts in a subnet connected to a first L2 VTEP do not have direct routes to hosts in another subnet connected to a second L2 VTEP. Thus, when a data packet is sent from a host in one subnet to a host in another subnet, the source host sends the data packet to the virtual network interface dedicated to its subnet (which operates as its gateway), which is reachable via the first L2 VTEP. The data packet thus includes, as its destination MAC address, the virtual MAC address shared by the L3 VTEPs. When the first L2 VTEP receives the data packet, that L2 VTEP bridges the data packet to the virtual MAC address shared by the L3 VTEPs via a VxLAN tunnel (i.e., by encapsulating the data packet in a VxLAN header) with a destination IP address set to the VIP address shared by the L3 VTEPs. This happens because the virtual MAC address shared by the L3 VTEPs is advertised as being behind the VIP address shared by the L3 VTEPs. Since the L3 VTEPs share the same VIP address, the L2 VTEPs will have a route for the VIP address that points to an equal cost multipath (ECMP) group in which all of the L3 VTEPs are members. Thus, the data packet destined for the VIP address shared by the L3 VTEPs can be sent to any one of the L3 VTEPs (the decision of which L3 VTEP to use is resolved via an ECMP determination). The data packet may then be hashed, and the resulting hash may be mapped to the particular L3 VTEP to which the data packet is sent.

Upon receiving the data packet, the L3 VTEP decapsulates the data packet and routes the data packet into the subnet of the destination host based on the destination IP address (i.e., the IP address of the destination host) included in the data packet. The L3 VTEP further searches an address resolution table (e.g., an address resolution protocol (ARP) table or a neighbor discovery protocol (NDP) table) associated with a virtual routing and forwarding (VRF) instance for the subnet of the destination host, for an entry (e.g., an IP-to-MAC address binding) having the destination IP address of the data packet to identify the MAC address of the destination host. Once the MAC address of the destination host is identified, the data packet is bridged to the identified MAC address.

If the L3 VTEP's address resolution table associated with the VRF instance for the subnet of the destination host does not include an entry for the destination IP address of the data packet, the L3 VTEP will transmit an address resolution request message (e.g., an ARP request message and/or an NDP neighbor solicitation message). The address resolution request message includes, as a source MAC address, the virtual MAC address shared by the L3 VTEPs, and, as a destination IP address, the destination IP address included in the data packet. Because the L3 VTEP does not know to which L2 VTEP the host having the destination IP address is connected, the L3 VTEP sends the address resolution request message (via VxLAN tunnels) to all the L2 VTEPs associated with the broadcast domain of the destination subnet. Those L2 VTEPs in turn decapsulate and relay the address resolution request message to each of the hosts in the destination subnet that are connected to them.

When the host having the destination IP address receives the address resolution request message, that host will then send an address resolution reply (ASR) message (e.g., an ARP reply message and/or an NDP neighbor advertisement message) including (as a source IP address and a source MAC address) the IP address and MAC address of the host, and (as a destination MAC address) the virtual MAC address shared by the L3 VTEPs. The host sends the address resolution reply message to the L2 VTEP to which it is connected, to be relayed to the virtual MAC address shared by the L3 VTEPs. When the L2 VTEP receives the address resolution reply message, the L2 VTEP encapsulates the message in a VxLAN header with the destination MAC address set to the virtual MAC address shared by the L3 VTEPs. Because the virtual MAC address is advertised as being behind the VIP shared by the L3 VTEPs, and the L2 VTEP's route to that VIP points to the ECMP group including all the L3 VTEPS, the L2 VTEP will again resolve the decision of which L3 VTEP to send the encapsulated address resolution reply message to via an ECMP determination. Thus, it is possible that the address resolution reply message will be sent to a L3 VTEP that is not the same L3 VTEP that was the source of the address resolution request message. Further, because the L3 VTEPs are configured with the same virtual MAC address, the L3 VTEP receiving the address resolution reply message will "consume" the message and not relay it further. This may result in data packets sent to a first L3 VTEP being lost if the address resolution reply message is sent to a second L3 VTEP.

Systems and methods addressing such problems are described herein in which L3 VTEPs are configured to (i) extract IP-to-MAC bindings from received VxLAN encapsulated address resolution reply messages they receive (via VxLAN tunnels), and (ii) include such IP-to-MAC bindings in messages generated and advertised by the L3 VTEPS in response to receiving the VxLAN encapsulated address resolution reply messages. The advertised messages are understood by intended recipients but disregarded as invalid by non-intended recipients. In some described embodiments, for example, the advertised messages are ethernet virtual private network (EVPN) update messages (e.g., border gateway protocol (BGP) EVPN paths), and the included IP-to-MAC bindings are the source IP and MAC addresses extracted from the received VxLAN encapsulated address resolution reply messages. In some embodiments the advertised EVPN update messages are incomplete. For example, the nexthop field of the EVPN update message may be empty, have an invalid entry, or have a predetermined "martian address" as the entry. Additionally or alternatively, the EVPN update message may include an entry in a special field (such as an extended community attribute or a BGP community attribute). The presence of an incomplete or invalid entry in the nexthop field, and/or the presence of an entry in the special field, will cause devices that are not the intended recipients to disregard the EVPN update message as invalid. The intended recipients (e.g., other L3 VTEPs), however, will identify the presence of an incomplete or invalid entry in the nexthop field, and/or the presence of an entry in the special field of the EVPN update message, and extract the IP-to-MAC binding from the EVPN update message to be stored in the L3 VTEPs' address resolution table. The incomplete or invalid entry in the nexthop field, and/or the presence of an entry in the special field, will further cause the L3 VTEP to extract only the IP-to-MAC binding from the EVPN update message and not use the EVPN update message for MAC learning (e.g., to learn a route for the MAC address that is included in the EVPN update message).

Upon receiving the EVPN update message, an L3 VTEP extracts the IP and MAC addresses included in the EVPN update message and determines whether its address resolution table associated with the VRF instance for the subnet of the IP address includes an entry matching that IP-to-MAC address binding. If that address resolution table includes an entry matching the IP-to-MAC address binding, the L3 VTEP does not do anything further regarding the EVPN update message. However, if that address resolution table does not include an entry matching the IP-to-MAC address binding, the L3 VTEP generates an entry in that address resolution table for the IP-to-MAC address binding.

Once an IP-to-MAC address binding is identified, the L3 VTEP further retrieves from its MAC table an entry matching the MAC address that was extracted from the EVPN update message and extracts from the entry a nexthop identifier. In some embodiments, this entry was added to the MAC table after the L3 VTEP received a route advertisement including the MAC address from the L2 VTEP. The L3 VTEP may then route, to the host, previously received data packets (e.g., data packets stored in a cache while the MAC address of the destination host is identified) and newly received data packets including, as the destination IP address, the IP address of the host.

FIG. 1 shows an illustrative diagram of system 100 for synchronizing ARP bindings. System 100 is shown as having two hosts 102 and 112 connected to two Layer 2 (L2) Virtual Tunnel End Points (VTEPs) 104 and 114. However, one skilled in the art would understand that the same techniques may be used by a system containing any number of hosts, L2 VTEPS that are configured to provide any number of Virtual Local Area Networks (VLAN). For example, each VLAN maybe be a VLAN configured using Virtual Extensible LAN protocol, and having Virtual Extensible LAN (VxLAN) protocol, where each VLAN has a VxLAN identified (VNI). For example, host 102 may have a connection to L2 VTEP 104 via VNI 106 (e.g., VNI having identifier "10"), and host 112 may have a connection to L2 VTEP 114 via VNI 116 (e.g., VNI having identifier "20"). In some embodiments, hosts 102 and 112 may be physical hosts. In some embodiments, hosts 102 and 112 may be virtual machine hosts controlled by hypervisors (not shown).

In some embodiments, L2 VTEP 104 and L2 VTEP 114 may be restricted to VxLAN bridging, while routing functionality may be provided by VTEP R1 120 and VTEP R2 130 (e.g., using the centralized routing model). In some embodiments, both VTEP-R1 120 and VTEP-R2 130 are configured with the same virtual MAC address and the same virtual VTEP address. Both VTEP-R1 120 and VTEP-R2 130 may each be configured with Switched Virtual Interfaces (SVIs) corresponding to VNI 106 as well as VNI 116. In some embodiments, SVIs of VTEP-R1 120 dedicated to VNI 106 and SVIs of VTEP-R2 130 may be configured with the same virtual IP address (VIP).

In some embodiments, links between VTEPs 104, 114, 120, and 130 may be an overlay virtual links configured over an underlay of physical devices. In some embodiments, the underlay may be a mesh of devices. In some embodiments, VTEPs 104, 114, 120, and 130 may be configured to establish an EVPN connection using a Route Reflector (RR). In some embodiments, L3 VTEPs 120 and 130 may be configured as members of an Equal-Cost Multi-Path Routing (ECMP) group 140. One skilled in the art would understand that ECMP group 140 may include any number of L3 routers servicing any number of VLANs Once the EVPN session is established, both VTEP-R1 120 and VTEP-R2 130 may advertise the shared virtual MAC address such that it is located behind the virtual VIP (e.g., VIP of SVI 10 and SVI 20). When VTEP 104 or VTEP 114 needs to bridge packets to the shared virtual MAC address, it may be encapsulated in a VxLAN header with a destination VIP address of the virtual VTEP. Since both VTEP-R1 120 and VTEP-R2 130 share the virtual VTEP IP address, on VTEP 104 and VTEP 114, the route for the virtual VTEP IP will point to ECMP group 140, in which VTEP-R1 120 and VTEP-R2 130 are ECMP members. In some embodiments, SVI-10 of both VTEP-R1 120 and VTEP-R2 130 (for servicing subnet 106 reachable by L2 VTEP 104) will share the same virtual MAC, and SVI-20 of both VTEP-R1 120 and VTEP-R2 130 (for servicing subnet 116 reachable by L2 VTEP 114) will share another same virtual MAC. In some embodiments, all SVIs of VTEP-R1 120 and VTEP-R2 130 will share same virtual MAC address.

Figure 2:
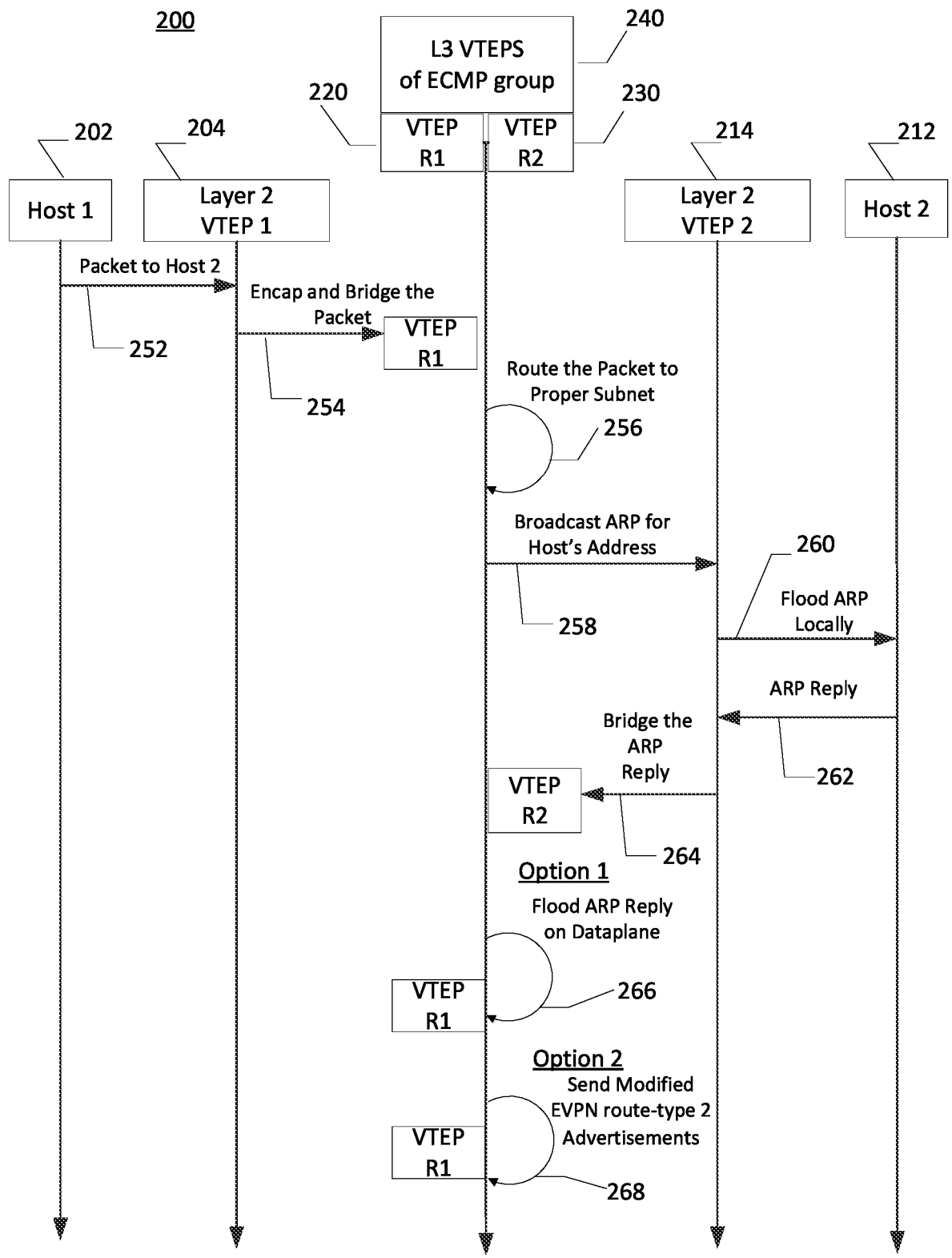
FIG. 2 is a flowchart of an illustrative process for synchronization of ARP binding, in accordance with some embodiments of the present disclosure.

FIG. 2 is a flowchart of an illustrative process for synchronization of Address Resolution Protocol (ARP) binding, e.g., in centralized routing architecture illustrated by system 100 of FIG. 1. In some embodiments, the synchronization may involve hosts 202 and 212 (which may be the same as hosts 102 and 112), L2 VTEPs 204 and 214 (which may be the same as L2 VTEPS 104 and 114) and L3 VTEPS 220 and 230 (which may be the same as VTEPS 120 and 130). In some embodiments, VTEPS 220 and 230 are configured as part of ECMP group 240 (which may be the same as ECMP group 140) and may include SVIs for connection to sublets reachable via VTEPS 220 and 230. Each such SVI may have a shared VIP address and a shared virtual MAC address. VTEPS 220 and 230 may be configured to performed L3 routing of packets (e.g., over the overlay and/or over the underlay) for each such SVI dedicated to serving its subnet (e.g., VLANs associated with VNI 106 and VNI 116).

At block 252, host 202 may attempt to transmit a packet to host 212. In the shown example, host 202 (connected to VTEP 204, e.g., over VLAN with VNI 106 of FIG. 1) does not have a direct connection to host 212 (connected to VTEP 214, e.g., over VLAN with VNI 116 of FIG. 1). For this reason, host 202 may configure the packet to be sent to an SVI (e.g., SVI-10) dedicated to its subnet (e.g., VNI 106), which operates as a gateway for host 202. The SVI is reachable via L2 VTEP 204, hence the packet is sent to VTEP 204.

At 254, VTEP 204 receives the packet from host 202. VTEP 204 then bridges the data packet to the virtual MAC address shared by the L3 VTEPs 220 and 230 via a VxLAN tunnel (i.e., by encapsulating the data packet in a VxLAN header) with a destination IP address set to the VIP address shared by L3 VTEPs 220 and 230. This happens because the virtual MAC address shared by L3 VTEPs 220 and 230 was advertised as being behind the same VIP address shared by L3 VTEPs 220 and 230. Since L3 VTEPs 220 and 230 share the same VIP address, L2 VTEP 204 will have a route for that VIP address that points to ECMP group 240. Depending on any of the factors that influence the ECMP decision, the packet bridged at block 254 and destined for the VIP address shared by L3 VTEP 220 and 230 may be sent to any one of L3 VTEPs 220 and 230. In the shown example, the packet is received by VTEP R1 220.

At step 256, upon receiving the data packet bridged in block 254, L3 VTEP 220 decapsulates the data packet and routes the data packet toward an SVI that services the subnet of destination host 212 (e.g., SVI 20 of FIG. 1) based on the destination IP address (i.e., the IP address of destination host 212) included in the data packet.

Post routing, L3 VTEP 220 will decapsulate the packet and will identify a need to identify the MAC address of host 212. VTEP 220 may search a locally stored address resolution table (e.g., an address resolution protocol (ARP) table or a neighbor discovery protocol (NDP) table) associated with a virtual routing and forwarding (VRF) instance for the subnet (e.g. VNI 116) of destination host 212, for an entry (e.g., an IP-to-MAC address binding) having the destination IP address of the data packet to identify the MAC address of destination host 212. If such a binding already exists, and once the MAC address of destination host 212 is identified, the data packet is bridged to the identified MAC address (e.g., via VTEP 214).

At 258, if the address resolution table of L3 VTEP 220 associated with the VRF instance for the subnet (e.g., VNI 116) of destination host 212 does not include an entry for the destination IP address of the data packet, L3 VTEP 220 will transmit an address resolution request message (e.g., an ARP request message and/or an NDP neighbor solicitation message). For example, the ARP request may be broadcasted locally as well as on a VxLAN tunnel in the VNI of host 212 (e.g., VNI 116)

The ASR message includes, as a source MAC address, the virtual MAC address shared by L3 VTEPs 220 and 230. The ASR message also includes, as a destination IP address, the destination IP address included in the data packet that is bridged in step 254. In some embodiments, because L3 VTEP 220 does not know to which L2 VTEP (e.g., to VTEP 204 or VTEP 214) host 212 having the destination IP address is connected, L3 VTEP 220 sends the ARP request message (via VxLAN tunnels) to all the L2 VTEPs (e.g., VTEPS 220 and 230) associated with the broadcast domain of the destination subnet.

Those L2 VTEPs, in turn, decapsulate and relay the ASR request message to each of the hosts in the destination subnet (e.g., in the VLAN associated with VNI 116) that are connected to them. For example, at block 260 VTEP 214 may receive the VxLAN encapsulated ARP request packet, decapsulate it, and flood the ASR request message locally in its VLAN (e.g., in the VLAN of VNI 116).

When hosts other than host 212 receive the ARP request message, they will simply drop it. On the other hand, when host 212 (having the destination IP address), receives the ARP request message, it will generate an address resolution reply message. At 262, host 212 will send the address resolution reply message (e.g., an ARP reply message and/or an NDP neighbor advertisement message) including (as a source IP address and a source MAC address) the IP address and MAC address of host 212, and (as a destination MAC address) the virtual MAC address shared by L3 VTEPs 220 and 230. Host 212 may send the address resolution reply message to the L2 VTEP to which it is connected, to be relayed to the virtual MAC address shared by L3 VTEPs 220 and 230. When L2 VTEP 214 receives the address resolution reply message, it encapsulates the message in a VxLAN header with the destination MAC address set to the virtual MAC address shared by L3 VTEPs 220 and 230.

Because the virtual MAC address of VTEPs 220 and 230 is advertised as being behind the VIP shared by L3 VTEPs 220 and 230, and the L2 VTEP's route to that VIP points to ECMP group 240 that includes both L3 VTEPs 220 and 230, L2 VTEP 214 will again resolve the decision of which L3 VTEP to send the encapsulated address resolution reply message to via an ECMP determination. For this reason, it is possible that the address resolution reply message will be sent to L3 VTEP 230, which is not the same as L3 VTEP 220, which was the source of the address resolution request message sent at step 258. Further, because L3 VTEPs 220 and 230 are configured with the same virtual MAC address, L3 VTEP 230, after receiving the address resolution reply message, may simply "consume" the address resolution reply message sent at step 264 and not relay it further. This may result in data packets sent to L3 VTEP 220 being lost if the address resolution reply message is sent to L3 VTEP 230.

In one approach, to solve this issue, when any VTEP (e.g., L3 VTEP 230) receives the ARP reply, it floods the ARP reply packet again in the VNI (e.g., in VNI 116) using a VxLAN flood list on a data plane. For example, at optional block 266, VTEP 230 may flood the ARP reply packet in VNI 116. This results in VTEP R1 220 receiving the VxLAN encapsulated ARP reply. VTEP R1 220 can then transmit the packet received at block 254 to host 212. However, such a data-plane flood approach will result in every ARP reply being flooded in the data plane. As network scales, the number of hosts can easily climb into several tens of thousands, and the number of switches/routes in the network can easily climb into several thousands. Flooding the ARP packets in such huge networks may result in degraded performance.

Figure 4:
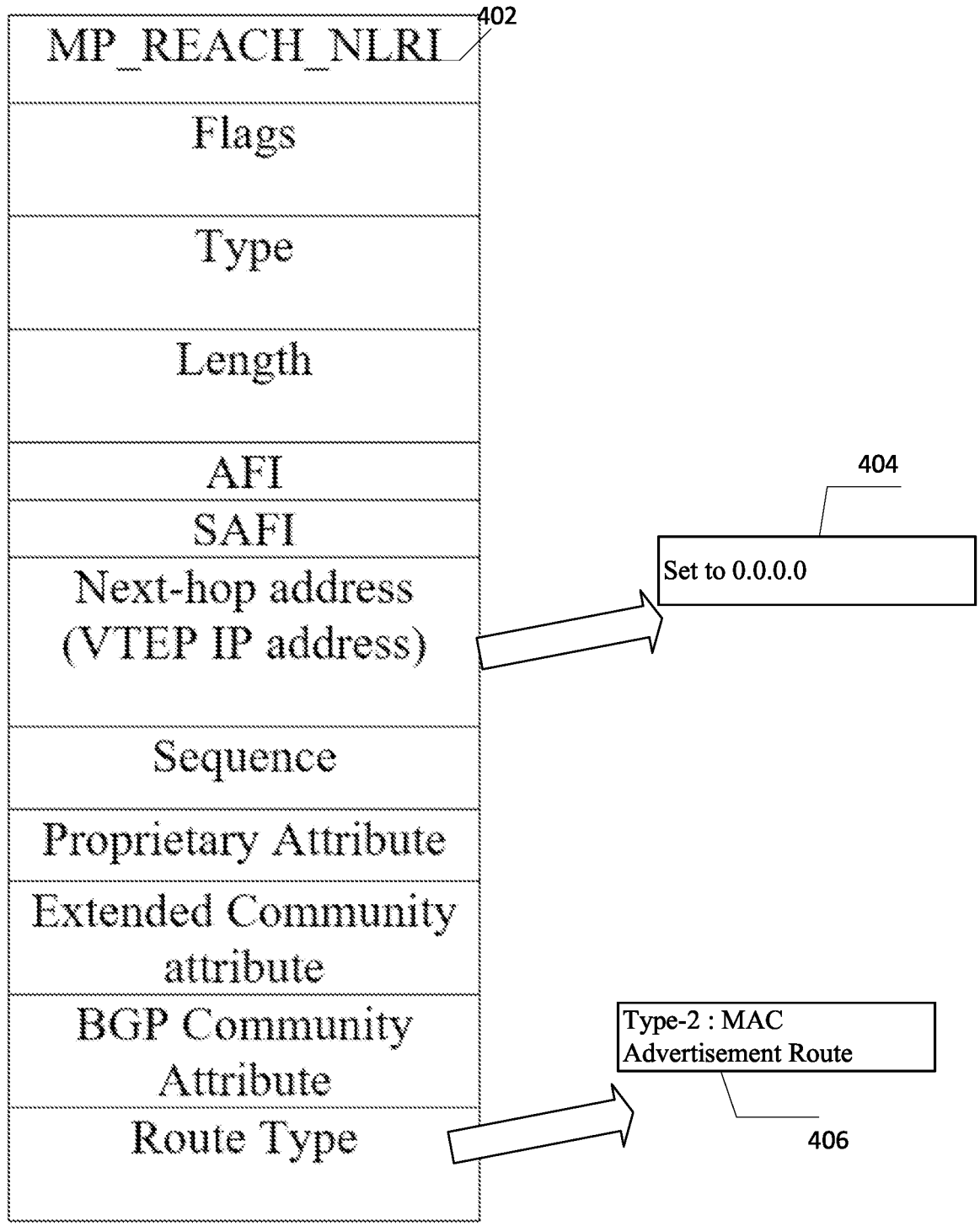
FIG. 4 shows a diagram of an illustrative route advertisement message, in accordance with some embodiments of the present disclosure.

At block 268, another approach may be used to overcome the aforementioned problems of the approach of block 266. In some embodiments, block 268 may be performed instead of block 266 to avoid the data plane flooding (e.g., the device may refrain from data plane flooding). In particular, the steps described below provide a way to forward IP-to-MAC bindings to proper L3 VTEP using control plane messaging (e.g., modified EVPN route-type 2 advertisements). An exemplary EVPN route-type 2 advertisement is shown in FIG. 4.

To ensure that VTEP 220 learns the MAC address of host 212, L3 VTEP 230 may be configured to (i) extract IP-to-MAC binding from received VxLAN encapsulated address resolution reply messages that are received (e.g., via VxLAN tunnel at step 264), and (ii) include such IP-to-MAC binding in a message or messages (e.g., control plane messages) generated and advertised by L3 VTEP 230, in response to receiving the VxLAN encapsulated address resolution reply messages. In some embodiments, the message or messages sent in this fashion at block 268 may be a specially modified EVPN route-type 2 advertisement messages. On receipt of such a message, VTEP R2 230 can then transmit the packet received at block 254 to host 212. This control plane message can be specially configured as describe below.

In some embodiments, the advertised message sent at block 268 may be configured in such a way as to be understood by intended recipients (e.g., by VTEPs 220 and 230) but disregarded as invalid by non-intended recipients (e.g., by VTEPs 204 and 214 and/or by other VTEPs, switches and routers). In some described embodiments, for example, the advertised messages are ethernet virtual private network (EVPN) update messages (e.g., border gateway protocol (BGP) EVPN paths), and the included IP-to-MAC bindings are the source IP and MAC addresses extracted from the received VxLAN encapsulated address resolution reply messages. In some embodiments, the advertised EVPN update messages may be set up to appear incomplete to non-intended recipients. For example, the nexthop field of the EVPN update message may be set to all zeros, may be empty, have an invalid entry, or have a predetermined "martian address" (e.g., a reserved address) as the entry.

Additionally or alternatively, the EVPN update message may include an entry in a special field (such as an extended community attribute or a BGP community attribute). The presence of an incomplete or invalid entry in the nexthop field, and/or the presence of an entry in the special field, will cause devices that are not the intended recipients to disregard the EVPN update message as invalid. The intended recipients (e.g., other L3 VTEPs 220 and 230), however, will identify the presence of an incomplete or invalid entry in the nexthop field, and/or the presence of an entry in the special field of the EVPN update message and identify the message as an IP-to-MAC binding message. In this case, VTEP 230 may extract the IP-to-MAC binding from the EVPN update message to be stored in L3 VTEP 230's address resolution table. The incomplete or invalid entry in the nexthop field, and/or the presence of an entry in the special field, will further cause L3 VTEP 230 to extract only the IP-to-MAC binding from the EVPN update message and not use the EVPN update message for MAC learning (which would otherwise be used to learn a route for the MAC address that is included in the EVPN update message).

In some embodiments, upon receiving the EVPN update message sent in block 268, L3 VTEP 220 extracts the IP-to-MAC addresses included in the EVPN update message and determines whether its address resolution table associated with the VRF instance for the subnet of the IP address includes an entry matching that IP-to-MAC address binding. If that address resolution table includes an entry matching the IP-to-MAC address binding, L3 VTEP 220 does not do anything further regarding the EVPN update message. However, if that address resolution table does not include an entry matching the IP-to-MAC address binding, L3 VTEP 220 generates an entry in that address resolution table for the IP-to-MAC address binding (e.g., for an appropriate VRF instance). This entry can then be used to properly address the packet received at step 254.

For example, once an IP-to-MAC address binding is identified, L3 VTEP 220 further retrieves from its MAC table an entry matching the MAC address that was extracted from the EVPN update message and extracts from the entry a nexthop identifier. In some embodiments, this entry was added to the MAC table after L3 VTEP 220 received a route advertisement including the MAC address from one of L2 VTEPs 204 or 214. L3 VTEP 220 may then route, to host 212, previously received data packets (e.g., data packets received at step 254 and stored in a cache while the MAC address of the destination host was being identified). VTEP 220 may also route any newly received data packets that include, as the destination IP address, the IP address of host 212 using the updated MAC table and address resolution table.

In some embodiments, step 268 may be performed pre-emptively, (e.g., whenever a new host connects to the network, or periodically). In this implementation, each L3 VTEP may have the needed IP-to-MAC binding for host 212.

Figure 3:
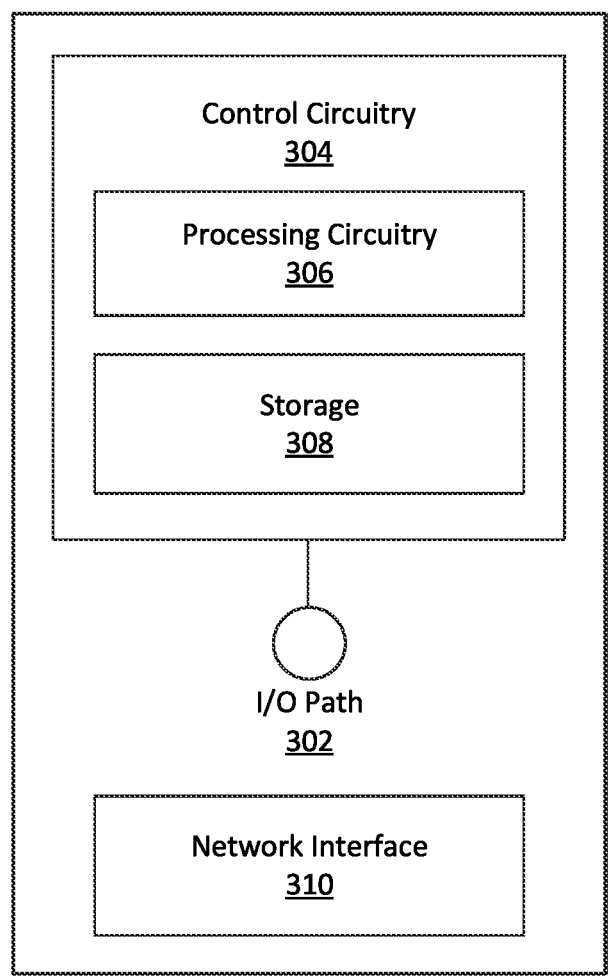
FIG. 3 shows a diagram of an illustrative network device for synchronization of ARP binding, in accordance with some embodiments of the disclosure.

FIG. 3 shows a generalized embodiment of a network device usable in a system for synchronization of ARP bindings, in accordance with some embodiments of the disclosure. In particular, device 300 of FIG. 3 may be any of the devices depicted in FIGS. 1 and 2 (e.g., devices 102, 104, 112, 114, 120, 130, 202, 212, 204, 214, 220, and 230) or may be a physical or virtual device hosting any of physical or virtual devices 102, 104, 112, 114, 120, 130, 202, 212, 204, 214, 220, and 230. Device 300 may be a router, an L3 switch, an L2 router, or a host, and/or any other computing device that may be configured to participate in synchronization of ARP bindings. Device 300 may receive data network interfaces 310 and provide the received data to control circuitry 304 via an input/output (I/O) path 302. Control circuitry 304 includes processing circuitry 306 and storage 308. Storage 308 may include volatile memory 330 (such as random-access memory (RAM), for example, static RAM and/or dynamic RAM), which does not retain its contents when power is turned off, and non-volatile memory 332 (such as, for example, a solid state drive (SSD), a hard disk drive (HDD), electrically erasable programmable read-only memory (EEPROM), etc.), which does retain its contents when power is turned off. Control circuitry 304 may send and receive commands, requests, and other suitable data using I/O path 302. As noted above, I/O path 302 connects control circuitry 304 (and specifically processing circuitry 306) to network interface 310, which in turn connects device 300 to one or more other devices. For example, I/O path 302 may provide a modified route advertisement used to learn IP-to-MAC binding.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions suitable to implement any of the techniques described above or below.

Storage 308 may be an electronic storage device that is part of control circuitry 304. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 308 may include an address resolution table, a neighbor discovery protocol table, and a MAC table. Multiple circuits may be provided to handle simultaneous processing functions. In some embodiments, device 300 may be a virtual device, wherein components 304, 306, 308, 302 and 310 are virialized on top of another physical device.

FIG. 4 depicts a diagram of an illustrative route advertisement message 400, in accordance with some embodiments of the present disclosure. In some embodiments, message 400 is a specially modified message configured to provide IP-to-MAC binding but not MAC learning, and configured to be ignored by unintended recipients. In some embodiments, message 400 may be a message that was sent as part of block 268 of FIG. 2.

In some embodiments, message 400 may be a message advertising multiprotocol reachable Network Layer Reachability Information (NLRI) message (MP_REACH_NLRI) which is normally used to advertise reachable route for MAC addresses. The message may include fields 402 including: a flags field, message type field, Length field, Address Family Identifier (AFI) field, Subsequent Address Family Identifier (SAFI) field, and a nexthop field. In some embodiments, message 400 may also include one or more of sequence number fields, Proprietary Attribute field, Extended Community Attribute field, BGP Community Attribute field, and a route type field. In some embodiments, message 400 may also include route length and route-specific fields. Message 400 may include fields for identifying a MAC address and IP address.

In some embodiments, the generating and advertising of the EVPN update message 400 is triggered by receiving an encapsulated ARP reply message (e.g., at block 262 of FIG. 2). In some implantations, the trigger for generating advertising message 400 may be VTEP 230 receiving an encapsulated (as opposed to a "naked" or non-encapsulated) ARP reply message. For example, the encapsulation could be for a VxLAN tunnel (which uses the Endpoint IP/MAC to route traffic through the underlay network of system 100) or a Multiprotocol Label Switching (MPLS) tunnel (which uses MPLS label(s) to route traffic though the underlay network system 100).

In some embodiments, the nexthop field of the EVPN Update message could be empty or set to all-zeros, as shown in block 404. In some embodiments, the nexthop field may be set to a "martian" (e.g., reserved) address. In either case, non-intended recipient devices may interpret this message as invalid and ignore it.

In an alternative embodiment, the nexthop field of message 400 could be a valid address (e.g., address of the device that generated message 400), and the EVPN update message 400 could have a proprietary attribute, a reused extended community attribute field, or a BGP community attribute field set to a value that either causes non-intended recipient devices to ignore the EVPN update message 400 (if they understand the attribute) or to deem the message invalid because they don't understand the attribute.

In some embodiments, EVPN update message 400 may be different from original EVPN update messages because message 400 may include an IP address, while an original EVPN update message does not include an IP address because the L2 VTEP (e.g., VTEP 204) does not know the IP. In some embodiments, EVPN update message 400 is also different because it may not include a valid nexthop address.

EVPN update message 400 will be configured to include IP-to-MAC binding information (e.g., the IP address of host 212 and MAC address of host 212). This information may be included in any suitable field of fields 402.

When an L3 VTEP (e.g., VTEP 220) receives the generated EVPN update message 400, the L3 VTEP will know to extract only the IP-to-MAC binding from the message and not to use the message to add or update an entry for the MAC address in its MAC table. For example, the L3 VTEP may know this due to detection of an all-zero IP address or invalid IP address in the nexthop field of message 400. In some embodiments, the L3 VTEP may identify the special IP-to-MAC binding update message due to message 400 including a specially encoded BGP path attribute.

In some embodiments, message 400 may include a sequence number field. For example, the sequence number of EVPN update message 400 may indicates the sequence number of the IP-to-MAC binding because EVPN update message 400 is not used to add or update an entry for the MAC address in the MAC table. A device that generates message 400 (e.g., VTEP 230) may calculate the sequence number by adding "1" to the sequence number of the last-received EVPN update message with the same IP address. In some embodiments, this is done because the MAC Address may have changed due to a host (e.g., host 202 or 212) going offline and a new host being added to the network and re-uses the same IP address. If no previously received EVPN update message included that IP address, the sequence number may be set to "0."

The L3 VTEP that receives message 400 (e.g., VTEP 220) may store the IP-MAC binding included in EVPN Update message 400 in its local ARP table corresponding to the appropriate VRF as identified by the EVPN import process and use that binding to forward packets addressed to that IP (e.g., a packet sent at block 252). If multiple EVPN update messages (similar to message 400) are received for the same IP address, the receiving L3 VTEP (e.g., VTEP 220) will use the IP-to-MAC binding from the EVPN update message with the highest sequence number.

Figure 5:
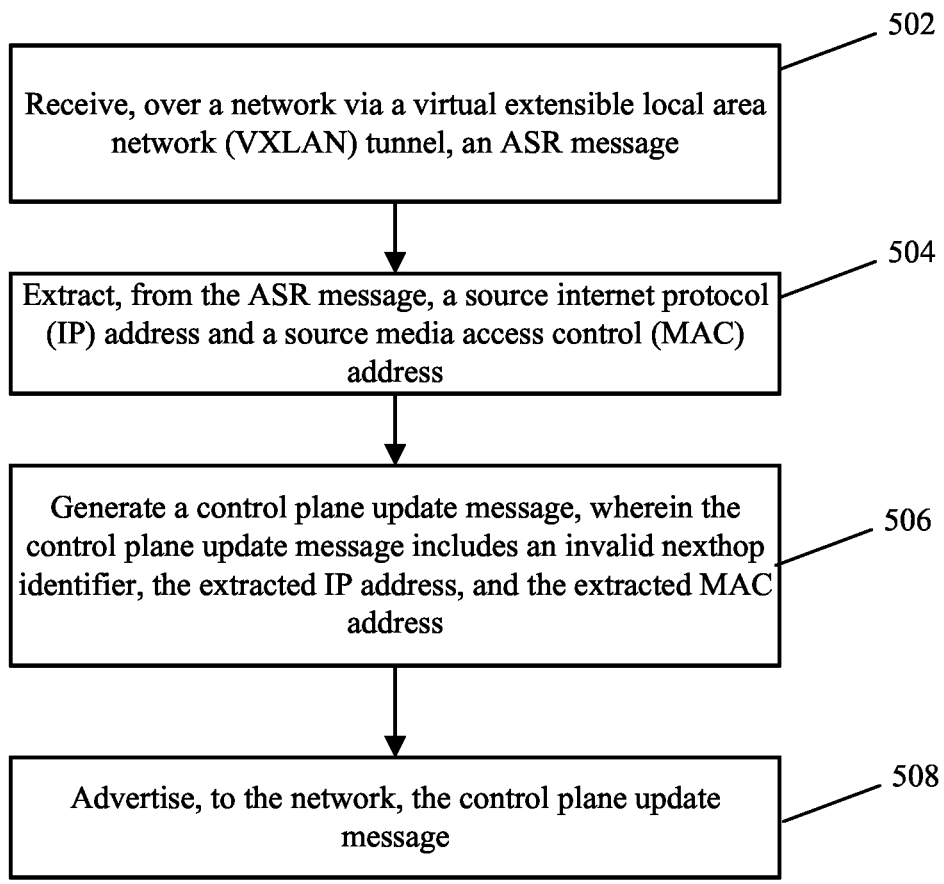
FIG. 5 is another flowchart of an illustrative process for synchronization of ARP binding, in accordance with some embodiments of the present disclosure.

FIG. 5 is another flowchart of a detailed illustrative process for synchronization of ARP binding, in accordance with some embodiments of the present disclosure. Process 500 may be performed by physical or virtual control circuitry, such as control circuitry 304 of device 300 (FIG. 3). For example, process 500 may be performed by control circuitry of VTEP 230 of FIG. 2. In some embodiments, the control circuitry performs process 500 in response to receiving an address resolution reply message as part of step 262 of FIG. 2.

At 502, the control circuitry receives, over a network via a VxLAN tunnel, an ASR message. In some embodiments, the ASR message may be encapsulated (e.g., by VTEP 214) for VxLAN transmission. At 504, the control circuitry may extract, from the ASR message, a source internet protocol (IP) address and a source media access control (MAC) address. For example, these actions may be triggered due to the receipt of an encapsulated ASR messagem as opposed to a naked ASR message via an underlay.

At 506, the control circuitry may generate a control plane update message (e.g., instead of flooding the ASR message on a data plane). For example, the control plane update message maybe an EVPN route-type 2 advertisement message (e.g., message 400 of FIG. 4) that includes the extracted IP address and the extracted MAC address. In some embodiments, the EVPN route-type 2 advertisement message may be modified in a special way (e.g., to signal that this message is used to indicate IP-to-MAC binding and is not to be used for MAC learning). In some embodiments, the message is modified such that it includes an invalid nexthop identifier. For example, the nexthop identifier may be set to "0.0.0.0." or to another invalid or reserved address. When such a message is received by an intended recipient (e.g., a VTEP with a knob special configuration), it will be used to learn indicated IP-to-MAC binding and not for MAC learning. When such a message is received by an unintended recipient (e.g., a VTEP without a special configuration), it will be marked as "INVALID" and ignored.

In some embodiments, the control circuitry may also identify a virtual routing and forwarding instance associated with the ASR message. The control circuitry may then also include a route distinguisher and a route target value of the virtual routing and forwarding instance in the message (e.g., message 400)

At 508, the control circuitry may advertise, to the network, the control plane update message. For example, the message may be sent to all reachable VTEPs.

Figure 6:
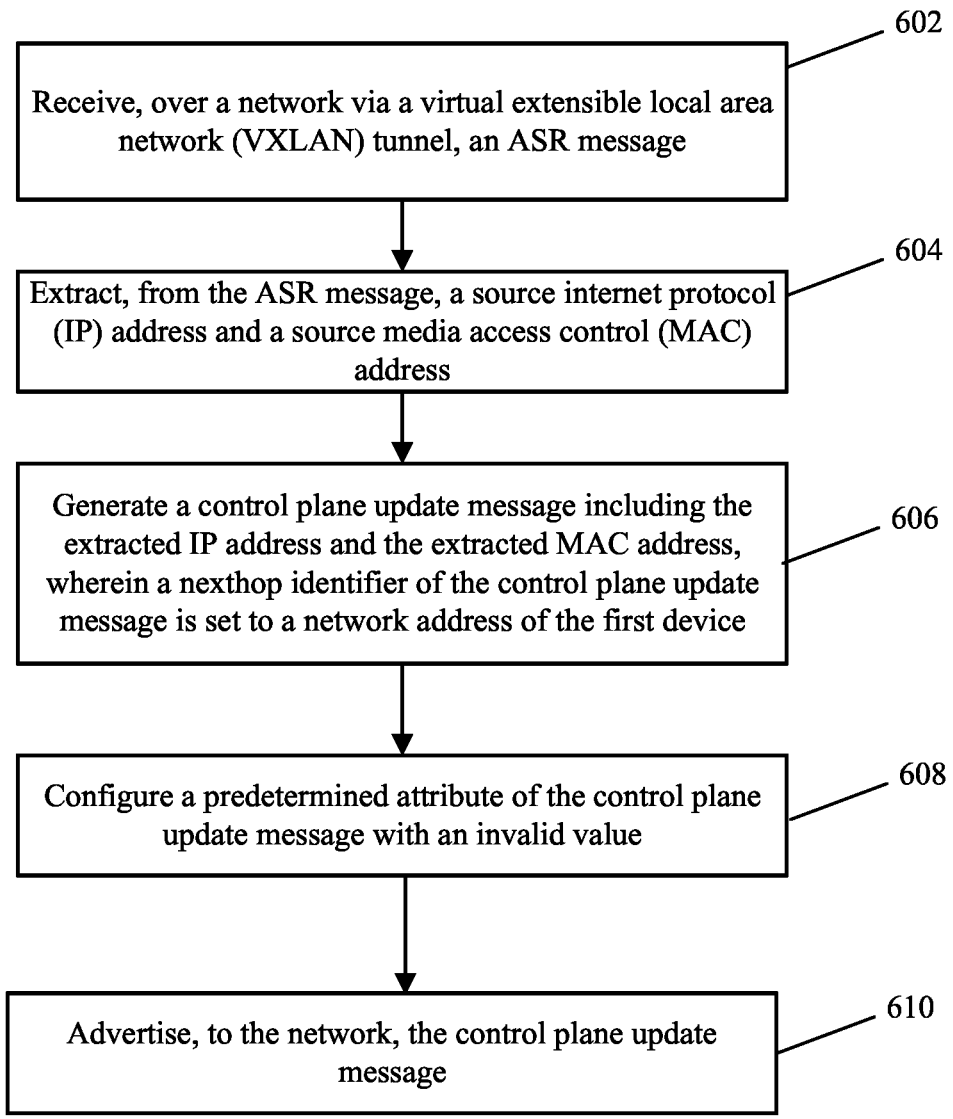
FIG. 6 is another flowchart of an illustrative process for synchronization of ARP binding, in accordance with some embodiments of the present disclosure.

FIG. 6 is another flowchart of a detailed illustrative process for synchronization of ARP binding, in accordance with some embodiments of the present disclosure. Process 600 may be performed by physical or virtual control circuitry of, such as control circuitry 304 of device 300 (FIG. 3). For example, process 600 may be performed by control circuitry of VTEP 230 of FIG. 2. In some embodiments, the control circuitry performs process 600 in response to receiving an address resolution reply message as part of step 262 of FIG. 2.

At 602, the control circuitry receives, over a network via a VxLAN tunnel, an ASR message. In some embodiments, the ASR message may be encapsulated (e.g., by VTEP 214) for VxLAN transmission. At 604, the control circuitry may extract, from the ASR message, a source internet protocol (IP) address and a source media access control (MAC) address. For example, these actions may be triggered due to the receipt of encapsulated ASR message as opposed to a naked ASR message via an underlay.

At 606, the control circuitry may generate a control plane update message (e.g., instead of flooding the ASR message on a data plane). For example, the control plane update message may be an EVPN route-type 2 advertisement message (e.g., message 400 of FIG. 4) that includes the extracted IP address and the extracted MAC address. In some embodiments, the EVPN route-type 2 advertisement message may be modified in a special way (e.g., to signal that this message is used to indicates IP-to-MAC binding and is not to be used for MAC learning). In some embodiments, the message is modified such that, the nexthop identifier is set to the IP network of the device which includes the control circuitry. In addition, the control circuitry will configure a predetermined attribute of the control plane update message with a special value (e.g., an otherwise invalid value). For example, the special value (e.g., an invalid value) may be included in one or more of: a Proprietary Attribute field of the message, Extended Community attribute field of the message, or a BGP Community Attribute of the message.

At 608, when such the message is received by an intended recipient (e.g., a VTEP with a special configuration), the special value will cause it to be used to learn indicated IP-to-MAC binding and not for MAC learning. When such a message is received by an unintended recipient (e.g., a VTEP without a proper knob special configuration), it will be marked as "INVALID" and ignored when the invalid value is identified.

In some embodiments, the control circuitry may also identify a virtual routing and forwarding instance associated with the ASR message. The control circuitry may then also include a route distinguisher and a route target value of the virtual routing and forwarding instance into the message (e.g., message 400)

At 610, the control circuitry may advertise, to the network, the control plane update message. For example, the message may be sent to all reachable VTEPs.

Figure 7:
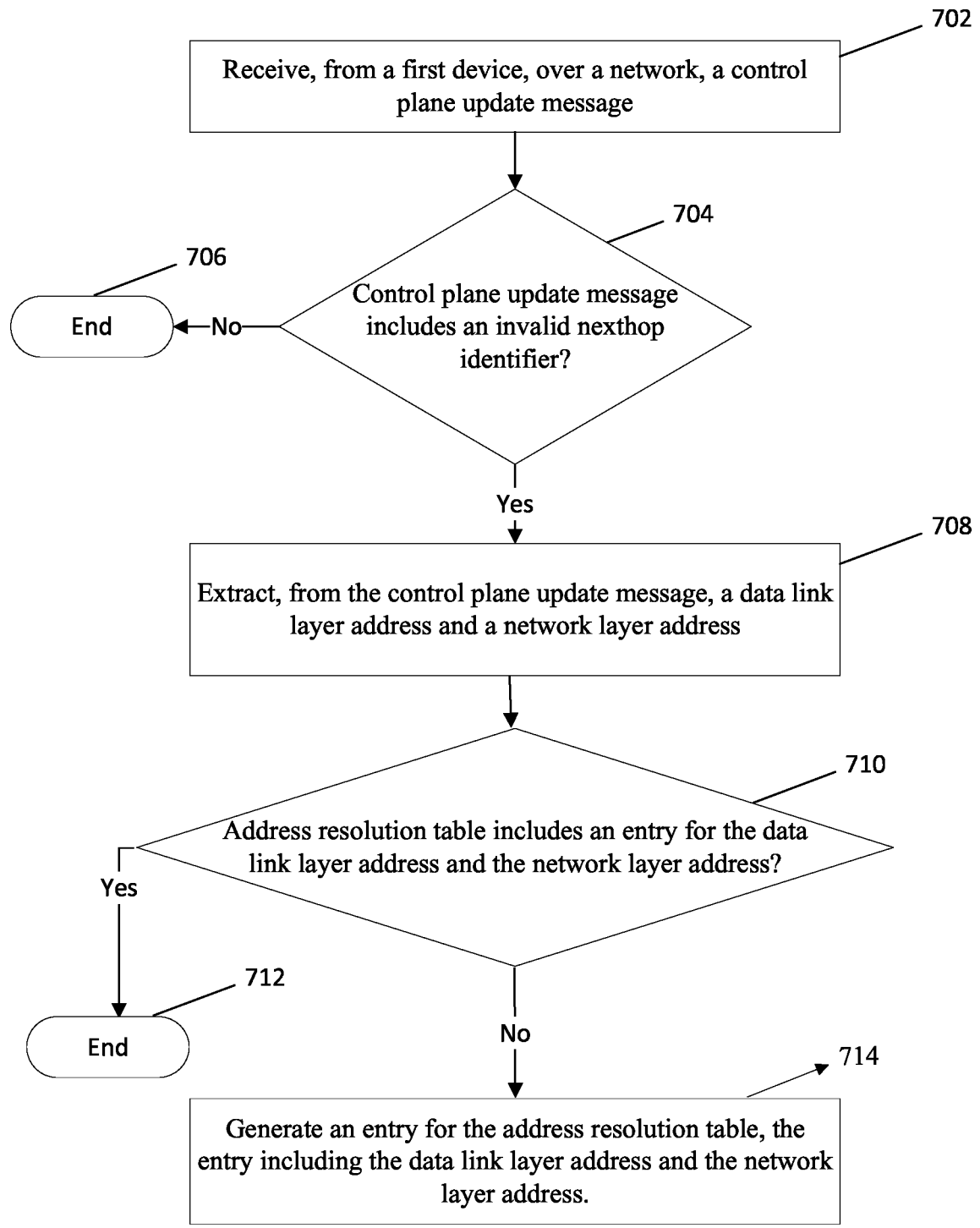
FIG. 7 is another flowchart of an illustrative process for synchronization of ARP binding, in accordance with some embodiments of the present disclosure.

FIG. 7 is another flowchart of a detailed illustrative process for synchronization of ARP binding, in accordance with some embodiments of the present disclosure. Process 700 may be performed by physical or virtual control circuitry of, such as control circuitry 304 of device 300 (FIG. 3). For example, process 700 may be performed by control circuitry of VTEP 220 of FIG. 2. In some embodiments, the control circuitry performs process 700 in response to receiving a modified route advertisement message as part of step 268 of FIG. 2.

At 702, the control circuitry (e.g., of VTEP 204) receives, from a first device (e.g., VTEP 214), over a network, a control plane update message (e.g., message advertised in step 508 of FIG. 5). In some embodiments, the message may be an EVPN route-type 2 advertisement message.

At 704, the control circuitry checks whether the control plane update message includes an invalid nexthop identifier. For example, the control circuitry may check if the nexthop identifier is empty, includes all zeroes, or includes a reserved (e.g., "martian") address. If no such invalid nexthop identifier is detected, process 700 ends at block 706. In some embodiments, instead of the ending the process, the control circuitry may, at block 706, perform MAC learning based on the valid nexthop identifier of the message. If an invalid nexthop identifier is identified, the control circuitry may proceed to step 708.

At 708, the control circuitry may extract, from the control plane update message, a data link layer address and a network layer address. In some embodiments, these addresses may be used for learning IP-to-MAC binding. For example, at 710, the control circuitry may check whether the address resolution table already includes an entry for the data link layer address and the network layer address. If such an entry exists, process 700 may end at 712. Otherwise, at 714, the control circuitry may generate an entry for the address resolution table, the entry including the data link layer address (e.g., MAC address) and the network layer address (e.g., IP address).

In some embodiments, the control circuitry may then use the updated address resolution table to properly address packets destined for the aforementioned the network layer address. In some embodiments, the control circuitry may also identify, based on the control plane update message, a virtual routing and forwarding instance. In this case, the control circuitry may retrieve the address resolution table associated with the virtual routing and forwarding instance (e.g., when more than the address resolution table is locally available to the control circuitry). In this case, the control circuitry will use the extracted address resolution table for steps 710-714.

In some embodiments, in response to identifying an invalid nexthop identifier at step 704, the control circuitry will prevent generation of an entry for a MAC table using the data in the BGP EVPN update message. For example, after determining that the extracted nexthop identifier is invalid, the control circuitry may refrain from generating an entry, for a table that stores routes, based on the data link layer address and nexthop identifier included in the control plane update message.

In some embodiments, the control circuitry may prevent generation of an entry for the MAC table using the data in the BGP EVPN update message based on an identifying entry in the special field in the message received at step 702. For example, the control circuitry may extract a predetermined attribute from the control plane update message and check if that attribute has an entry (e.g., a special flag). If so, the control circuitry may refrain from generating an entry, for a table that stores routes, based on the data link layer address and nexthop identifier included in the control plane update message.

In some embodiments, the control circuitry may prevent generation of an entry for the MAC table using the data in the BGP EVPN update message based on the nexthop field including a predetermined value (e.g., a special predetermined address). If such a predetermined address is detected, the control circuitry may refrain from generating an entry, for a table that stores routes, based on the data link layer address and nexthop identifier included in the control plane update message.

Figure 8:
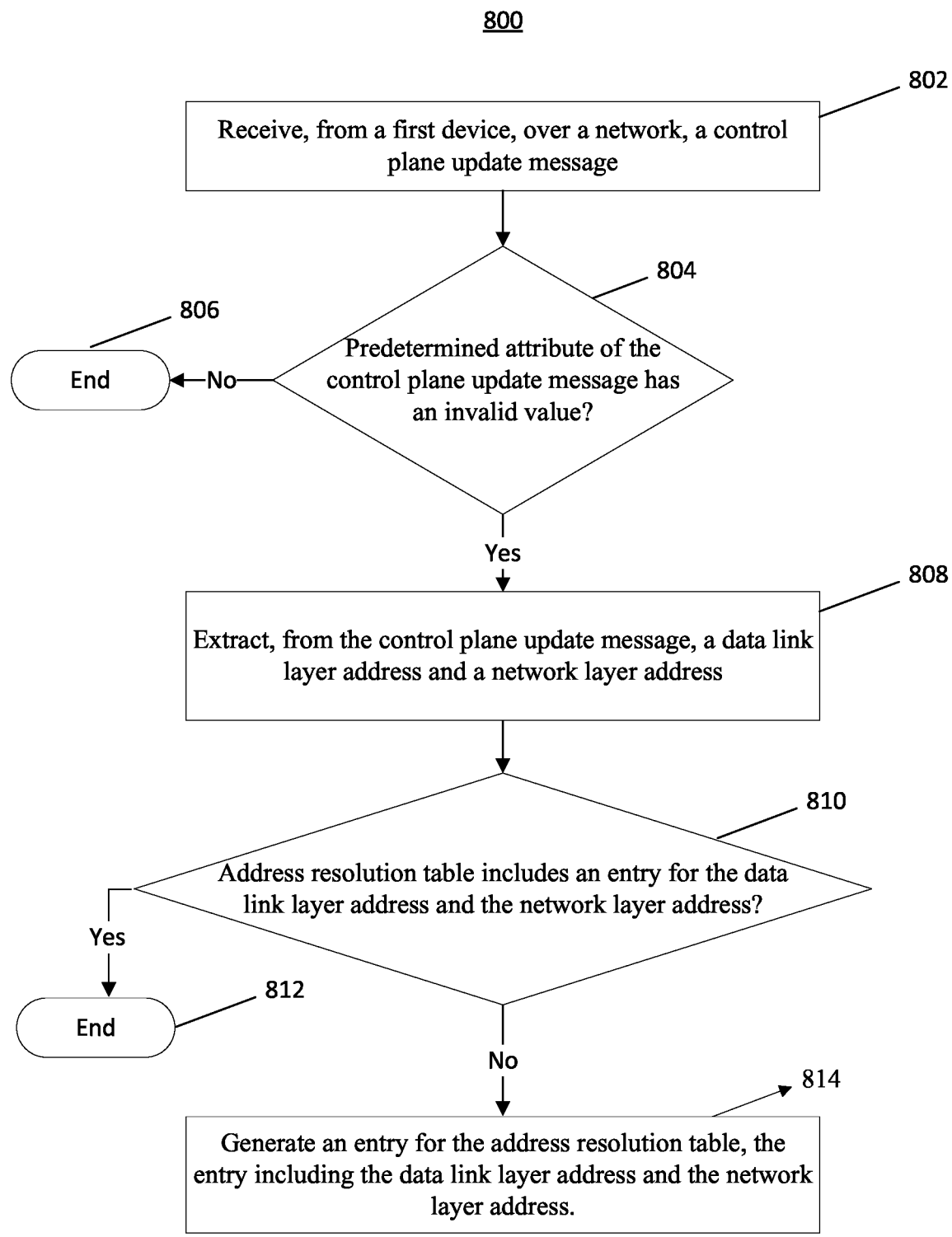
FIG. 8 is yet another flowchart of an illustrative process for synchronization of ARP binding, in accordance with some embodiments of the present disclosure.

FIG. 8 is another flowchart of a detailed illustrative process for synchronization of ARP binding, in accordance with some embodiments of the present disclosure. Process 800 may be performed by physical or virtual control circuitry, such as control circuitry 304 of device 300 (FIG. 3). For example, process 800 may be performed by control circuitry of VTEP 220 of FIG. 2. In some embodiments, the control circuitry performs process 800 in response to receiving a modified route advertisement message as part of step 268 of FIG. 2.

At 802, the control circuitry (e.g., of VTEP 204) receives, from a first device (e.g., VTEP 214), over a network, a control plane update message (e.g., message advertised in step 508 of FIG. 5). In some embodiments, the message may be an EVPN route-type 2 advertisement message.

At 804, the control circuitry checks whether a predetermined attribute of the control plane update message has an invalid value. For example, the control circuitry may check one or more of a proprietary attribute field, an extended community attribute field, and a BGP community attribute field for presence of an invalid value. If no such invalid value is detected, process 800 ends at block 806. In some embodiments, instead of the ending the process, the control circuitry may, at block 806, perform MAC learning based on the valid nexthop identifier of the message. If an invalid value is identified, the control circuitry may proceed to step 808.

At 808, the control circuitry extracts, from the control plane update message, a data link layer address and a network layer address. In some embodiments, these addresses may be used for learning IP-to-MAC binding. For example, at 810, the control circuitry may check whether the address resolution table already includes an entry for the data link layer address and the network layer address. If such an entry exists, process 800 may end at 812. Otherwise, at 814, the control circuitry may generate an entry for the address resolution table, the entry including the data link layer address (e.g., MAC address) and the network layer address (e.g., IP address).

In some embodiments, the control circuitry may then use the updated address resolution table to properly address packets destined for the aforementioned network layer address. In some embodiments, the control circuitry may also identify, based on the control plane update message, a virtual routing and forwarding instance. In this case, the control circuitry may retrieve the address resolution table associated with the virtual routing and forwarding instance (e.g., when more than one address resolution table is locally available to the control circuitry). In this case, the control circuitry will use the extracted address resolution table for steps 810-814.

In some embodiments, the control circuitry will also identify an invalid (e.g., all-zero) nexthop value (e.g., at step 804). In response, the control circuitry will prevent generation of an entry for a MAC table using the data in the BGP EVPN update message. For example, after determining that the extracted nexthop identifier is invalid, the control circuitry may refrain from generating an entry, for a table that stores routes, based on the data link layer address and nexthop identifier included in the control plane update message.

In some embodiments, the control circuitry may prevent generation of an entry for the MAC table using the data in the BGP EVPN update message based on identifying entry in a special field in the message received at step 802. For example, the control circuitry may extract a predetermined attribute from the control plane update message and check if that attribute has an entry (e.g., a special flag). If so, the control circuitry may refrain from generating an entry, for a table that stores routes, based on the data link layer address and nexthop identifier included in the control plane update message.

In some embodiments, the control circuitry may prevent generation of an entry for the MAC table using the data in the BGP EVPN update message based on the nexthop field including a predetermined value (e.g., a special predetermined address). If such a predetermined address is detected, the control circuitry may refrain from generating an entry, for a table that stores routes, based on the data link layer address and nexthop identifier included in the control plane update message.

While the processes 500, 600, 700, and 800 described above illustrate a single iteration of the operations of VTEPs to learn address bindings, those skilled in the art will appreciate that these processes may be iteratively repeated to learn multiple address bindings. The processes 400, 500, 600, 700, 800, 900, and 1000 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method comprising:
   receiving, at a network device, over a network, a control plane update message;
   determining, at a network device, whether the control plane update message includes an invalid nexthop identifier; and
   in response to determining that the control plane update message includes the invalid nexthop identifier, the network device:
      extracting, from the control plane update message, a data link layer address and a network layer address;
      determining whether an address resolution table includes an entry for the data link layer address and the network layer address; and
      in response to determining that the address resolution table does not include the entry for the data link layer address and the network layer address, generating an entry for the address resolution table, the entry including the data link layer address and the network layer address.

2. The method of claim 1, further comprising, the network device:
   identifying, based on the control plane update message, a virtual routing and forwarding instance; and
   retrieving the address resolution table associated with the virtual routing and forwarding instance.

3. The method of claim 1, further comprising, in response to determining that the control plane update message includes the invalid nexthop identifier, the network device refraining from updating a table of routes for data link layer addresses.

4. The method of claim 1, further comprising, the network device:
   extracting an attribute from the control plane update message;
   in response to the extracted attribute having a reserved value, refraining from updating a table of routes for data link layer addresses.

5. The method of claim 1, further comprising, when the control plane update message includes an invalid nexthop identifier and the nexthop identifier is a reserved value, the network device refraining from updating a table of routes for data link layer addresses.

6. A method comprising:
   receiving, at a network device, a control plane update message; and
   in response to the control plane update message having an attribute that contains a reserved value, the network device:
      extracting, from the control plane update message, a data link layer address and a network layer address, wherein network device includes an address resolution table that contains data link layer address and network layer address bindings; and
      when the address resolution table in the network device does not include a binding for the data link layer address and the network layer address, adding a binding in the address resolution table for the data link layer address and the network layer address.

7. The method of claim 6, further comprising identifying the address resolution table from a plurality of address resolution tables, including:
   identifying, based on the control plane update message, a virtual routing and forwarding instance; and
   retrieving the address resolution table associated with the virtual routing and forwarding instance.

8. The method of claim 6, further comprising, in response to the control plane update message having an attribute that contains a reserved value, the network device refraining from updating a table of routes for data link layer addresses.

9. The method of claim 6, further comprising:
   extracting a nexthop identifier from the control plane update message; and
   in response to the nexthop identifier being invalid, the network device refraining from updating a table of routes for data link layer addresses.

10. The method of claim 6, further comprising:
    extracting a nexthop identifier from the control plane update message; and
    in response to the nexthop identifier having a reserved value, the network device refraining from updating a table of routes for data link layer addresses.

11. A network device comprising:
    processing circuitry; and
    one or more memories,
    the processing circuitry configured to:
       receive a control plane update message; and in response to the control plane update message containing first information:
    update a first data table comprising data link layer address and network layer address bindings using a data link layer address and a network layer address contained in the control plane update message; and
    not updating a second data table comprising routes for data link layer addresses.

12. The network device of claim 11, wherein the first information is an invalid nexthop address.

13. The network device of claim 12, wherein the invalid nexthop address is 0.0.0.0.

14. The network device of claim 11, wherein the first information is a reserved value.

15. The network device of claim 11, wherein the first data table is an address resolution table, wherein the second data table is a media access control (MAC) table.

16. The network device of claim 11, further in response to the control plane update message containing first information, the processing circuitry is configured to:
    identify a virtual routing and forwarding (VRF) instance using information contained in the control plane update message;
    retrieve an address resolution table and a MAC table associated with the VRF instance, wherein the first data table is the address resolution table is the second data table is the MAC table.

* * * * *